US007810823B2

United States Patent
Van Mill et al.

(10) Patent No.: US 7,810,823 B2
(45) Date of Patent: Oct. 12, 2010

(54) OSCILLATING STEERING SYSTEM FOR AN AGRICULTURAL IMPLEMENT

(75) Inventors: Michael D. Van Mill, Shell Rock, IA (US); Ron Schlimgen, Waverly, IA (US); John Walvatne, Waterloo, IA (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 71 days.

(21) Appl. No.: 11/892,263

(22) Filed: Aug. 21, 2007

(65) Prior Publication Data

US 2008/0048414 A1   Feb. 28, 2008

Related U.S. Application Data

(60) Provisional application No. 60/839,425, filed on Aug. 23, 2006.

(51) Int. Cl.
 *B62D 13/00* (2006.01)
(52) U.S. Cl. ........................ 280/81.6; 280/419; 280/426; 280/442; 280/443; 280/100; 180/24.01
(58) Field of Classification Search ................ 280/81.6, 280/91.1, 98, 100, 408, 426, 442, 676, 124.11, 280/124.118, 124.119, 89.1, 89.12, 99–104, 280/93.501–93.508, 93.51; 180/24.11, 253
See application file for complete search history.

(56) References Cited

U.S. PATENT DOCUMENTS

| 3,292,725 | A |   | 12/1966 | Hlinsky |   |
|---|---|---|---|---|---|
| 3,806,160 | A | * | 4/1974 | Duerksen | ..................... 280/444 |
| 3,930,669 | A | * | 1/1976 | Kollander et al. | ........... 280/426 |
| 3,994,512 | A |   | 11/1976 | Parker et al. |   |
| 4,208,063 | A | * | 6/1980 | Baker et al. | .................. 280/445 |
| 5,090,512 | A | * | 2/1992 | Mullet et al. | ................. 180/236 |
| 5,477,937 | A |   | 12/1995 | Chagnon |   |
| 6,308,976 | B1 | * | 10/2001 | Mitchell | ...................... 280/419 |
| 6,488,114 | B1 | * | 12/2002 | McMahon et al. | .......... 180/414 |

(Continued)

FOREIGN PATENT DOCUMENTS

DE         9109012 U1    12/1991

(Continued)

OTHER PUBLICATIONS

European Search Report dated Jan. 17, 2008.

*Primary Examiner*—Paul N Dickson
*Assistant Examiner*—James English
(74) *Attorney, Agent, or Firm*—Rothwell, Figg, Ernst & Manbeck

(57) ABSTRACT

An oscillating in-line steering system for a pulled agricultural implement includes first and second in-line axles pivotably coupled with a frame. The system also includes at least first and second in-line wheel arrangements pivotably coupled with the first and second axles respectively. Each wheel arrangement has a plurality of pivotable wheel assemblies arranged in-line and wheel linkages coupling the in-line wheel assemblies such that in-line wheel assemblies oscillate together. A right-to-left linkage couples the wheel linkage of the first in-line wheel arrangement to the wheel linkage of the second in-line wheel arrangement so that the first in-line wheel arrangement oscillates at a steering angle proportional to that of the second in-line wheel arrangement.

18 Claims, 13 Drawing Sheets

U.S. PATENT DOCUMENTS 6,968,913 B1 * 11/2005 Priepke ................ 180/6.24

FOREIGN PATENT DOCUMENTS

| DE | 29717765 | U1 | 1/1997 |
|----|----------|----|--------|
| EP | 0518208  | A1 | 12/1992 |
| GB | 970542   |    | 9/1964 |
| GB | 2097733  | A1 | 11/1982 |
| WO | 86/07021 | A1 | 12/1986 |

* cited by examiner

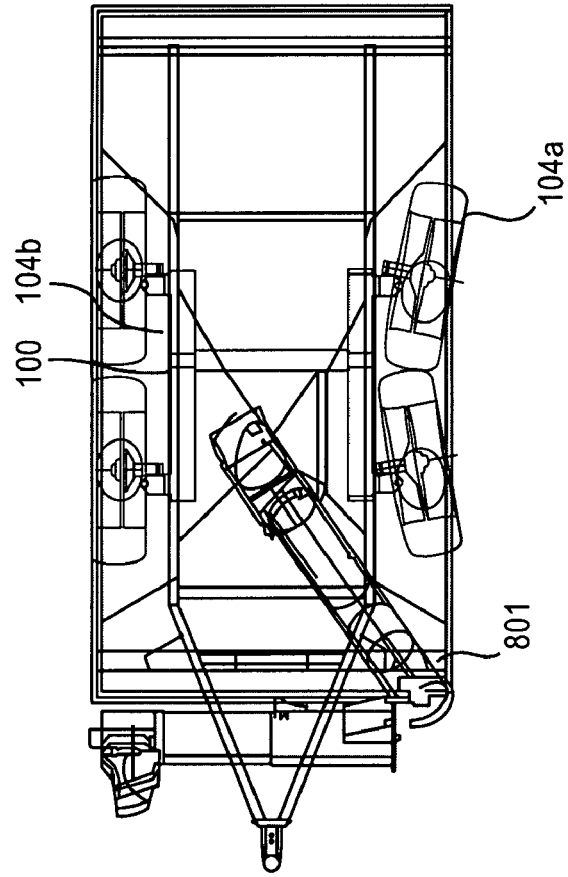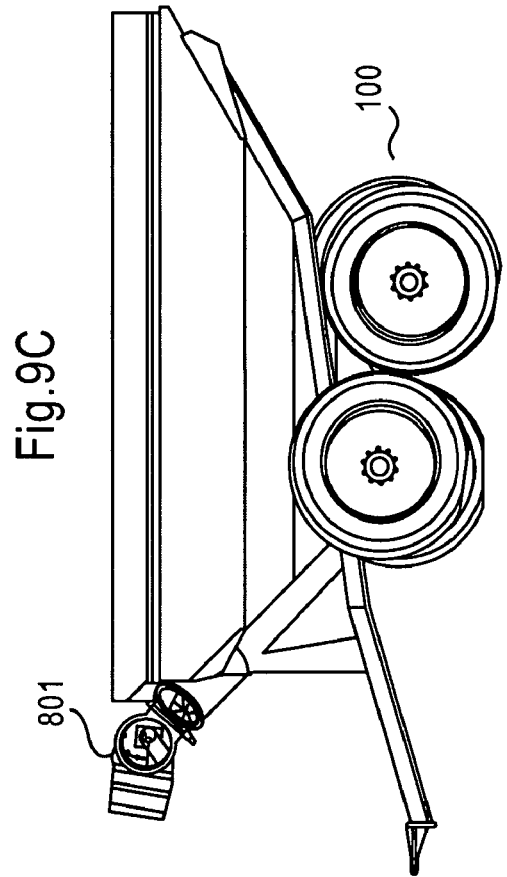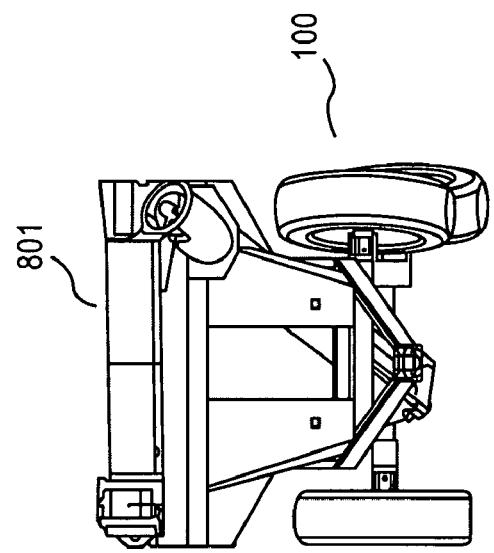

OSCILLATING STEERING SYSTEM FOR AN AGRICULTURAL IMPLEMENT

BACKGROUND OF THE INVENTION

1. Field of the Invention

The present invention is directed to steering systems for pulled agricultural implements, and in particular, to a novel steering system for a pulled agricultural implement having in-line wheel arrangements.

2. Description of the Related Art

Pulled agricultural implements, such as grain carts and the like, are known. Further, pulled agricultural implements having steering systems are known. Such steering systems have been known to take the forms of dual side-by-side arrangements of wheels. One problem with side-by-side arrangements, however, is a lack stability caused by the effective track width becoming centered between the tires. As a result, the agricultural implement can become unstable during turns. Hence, it is desireable to have a wheel arrangement that will increase stability during turns.

A dual in-line wheel arrangement is one proposed way to address this problem because of its minimal compaction, superior stability and excellent handling characteristics. Turning such an agricultural implement with a dual in-line arrangement, has proved difficult, however.

Thus, there is a continued need for new and improved systems and methods for steering pulled agricultural elements.

SUMMARY OF THE INVENTION

According to an embodiment of the present invention, a multi-wheel oscillating steering system for a pulled agricultural implement includes first and second in-line axles pivotably coupled with a frame. The system also includes at least first and second in-line wheel arrangements pivotably coupled with the first and second axles, respectively. Each wheel arrangement has a plurality of pivotable wheel assemblies arranged in-line (i.e., along the in-line axle) and wheel linkages coupling the in-line wheel assemblies (on one side) such that the in-line wheel assemblies oscillate together. A right-to-left linkage or other means can be provided for coupling the wheel linkages of the first in-line wheel arrangement to the wheel linkages of the second in-line wheel arrangement, so that the first in-line wheel arrangement oscillates at a steering angle that is proportional to the second in-line wheel arrangement.

According to an embodiment of the present invention, a steerable four-wheel oscillating tandem steering system for a pulled agricultural implement is provided. The steering system may comprise dual oscillating in-line tandem axles, each with a plurality of pivotable wheel assemblies. A linkage arrangement pivotably connects a front wheel assembly to a rear wheel assembly on each of the dual axles. A right to left linkage mechanically ties the dual inline tandem axles together to create a proportionate steering angle between the wheel assemblies. Additionally, an actuating device may be employed provide resistance or to actively pivot the wheel assemblies.

According to another embodiment of the present invention, the steering system may be configured to operate such that the pivoting of the front wheels in a tandem arrangement causes the rear wheels to pivot in the opposite direction, as the front and rear wheels are pivotably coupled to one another.

According to another embodiment of the present invention, the steering system may be operated, at least in part, actively. Actuating devices can be controlled (e.g., by the operation of a towing vehicle, control unit, etc.) to cause the wheels to pivot to a selected position.

According to another embodiment of the present invention, actuating devices may include hydraulic cylinders, electric motors or any appropriate means for controlling rotation of the wheel assemblies rotate.

According to an embodiment of the present invention, a steerable, in-line tandem axle is provided. In line wheel assemblies are provided and the front and rear wheel assemblies are pivotably coupled by a linkage arrangement.

BRIEF DESCRIPTION OF THE DRAWINGS

Further applications and advantages of various embodiments of the present invention are discussed below with reference to the following drawing figures:

FIGS. 8A-9C illustrate several different views of an agricultural element having a steerable tandem system, according to embodiments of the present invention;

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
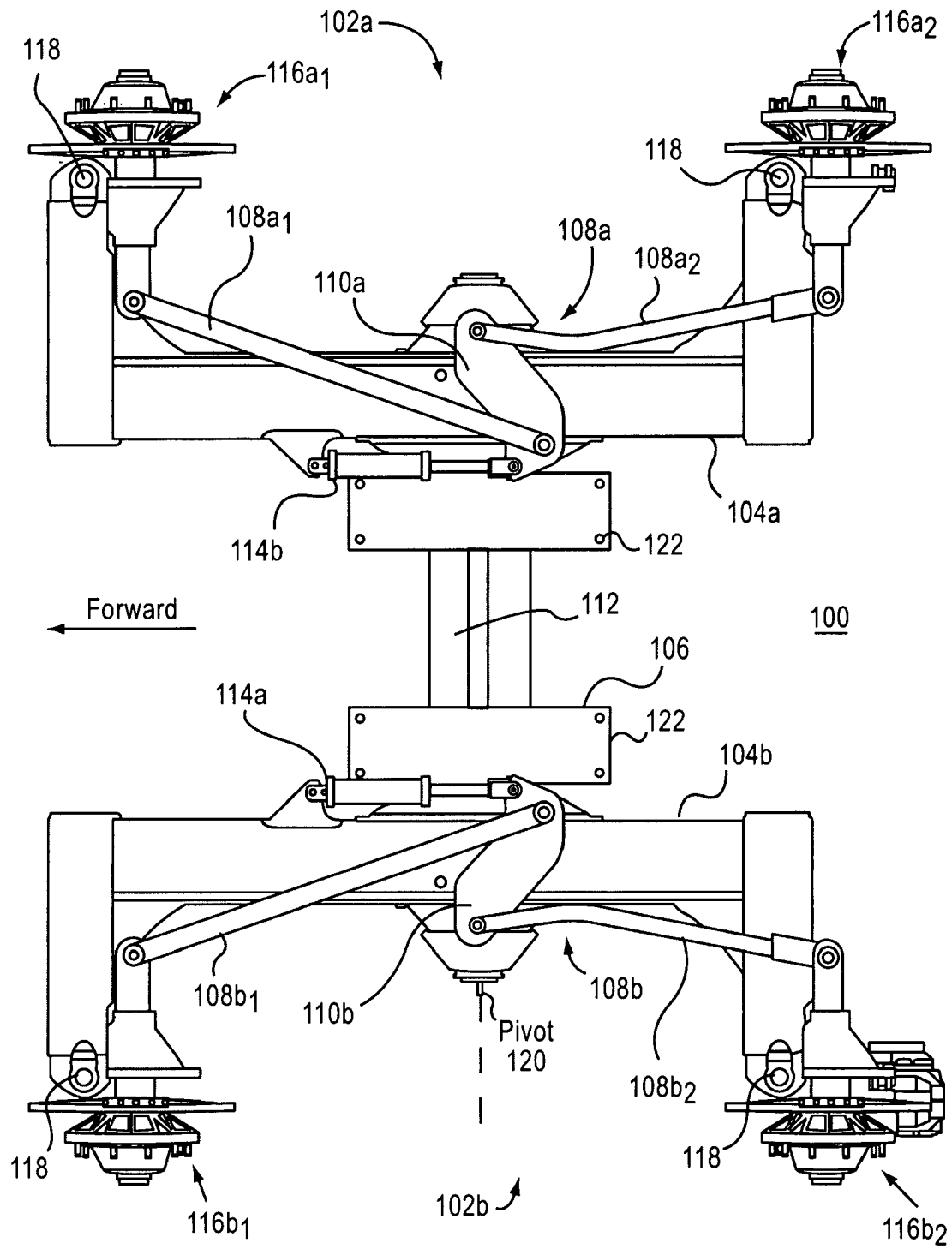
FIGS. 1-7 illustrate several different views of a steerable tandem system for an agricultural implement, according to embodiments of the present invention.

According to an embodiment of the present invention, a steering system for a pulled implement is illustrated in FIG. 1. System 100 includes in-line tandem wheel arrangements 102a and 102b (also called "in-line tandems"), which include tandem axles 104a and 104b respectively, that are each pivotably attached to a center frame 106. The frame 106 may include means for coupling the frame 106 with an agricultural implement, such as the hopper to form a grain cart or the like, such as flanges 122.

Each in-line wheel arrangement 102a, 102b includes front wheel assemblies $116a_1$ and $116b_1$, and rear wheel assemblies $116a_2$ and $116b_2$ pivotably respectively coupled with the tandem axles 104a and 104b. Wheel assemblies $116a_1$, $116a_2$, $116b_1$, and $116b_2$ can be pivotably attached to the tandem axles 104a and 104b by pivots ("kingpins") $118a_1$, $118a_2$, $118b_1$, and $118b_2$, or the like, such that the wheel assemblies are positioned rearward of the pivots. The wheel assemblies could also be positioned in line with the kingpin but are preferably not positioned forward of the kingpin.

Each in-line wheel arrangement 102a, 102b includes linkages for coupling front wheel assemblies 116a1, 116b1 with corresponding rear assemblies 116a2, 116b2, such that when a front wheel assembly pivots in one direction, the corresponding rear wheel assembly pivots in an opposite direction an equivalent amount. Accordingly, wheel assemblies can oscillate together.

For example, FIG. 1 shows linkage arrangements 108a, 108b pivotably coupling the front wheel assemblies $116a_1$ and $116b_1$ with rear wheel assemblies $116a_2$ and $116b_2$. Linkage arrangements 108a, 108b each include a pair of coupling rods $108a_{1-2}$, $108b_{1-2}$ pivotably coupled with each wheel assembly and with a rotating coupling 110a, 110b. The linkages are arranged such that the wheels will turn to accurately follow a towing vehicle. As shown, each rotating coupling 110a, 110b may be positioned slightly rearward of the tandem pivot axis 120. However, positioning of the rotating coupling can be varied.

A right to left linkage 112 can be provided through the center pivot axis coupling rotating couplings 110a and 110b so that oscillation can occur without affecting the steering geometry. The right to left linkage 112 mechanically couples the rotating couplings 110a, 110b to regulate the steering angles between the two in-line tandems. Accordingly, appropriate gearing or the like may be provided to create a proportional steering angle between the wheels one side relative to the wheels on the other side of the system. For example, in a turn, the wheels on the inside of the turn should be turned at an angle that is not equal to the angle of the wheels on the outside of a turn. Instead, the wheels on the inside of the turn should be turned at an angle that is proportionally greater than the angle that the wheels are tuned on the outside (e.g., due to the width of the implement, etc.). The linkages can be configured to allow the wheels on the inside of a turn to pivot at a greater angle than the wheels on the outside of a turn. Accordingly, the turning angles of the wheels on one side are preferably not the same as for the wheels on the other side during a turn.

The steerable wheel system 100 can be provided with means for turning the wheels. For example, it may be desirable to move the wheels from a turned position to a neutral position (i.e., straight ahead position) when pulling the implement out of turn. Further, it may be desirable to lock the wheels in the neutral position for backing or the like. Further, it might be desirable to be able to manually turn the wheels. Such means could include an actuation device such as a hydraulic or electric actuator. Further, the means could include other self-regulating or self-aligning arrangements, such as springs, air bags, etc. that would assist alignment of the wheels into a neutral position coming out of a turn.

As shown, in the present embodiment, one or both of rotating couplings 110a and 110b may be connected with actuating devices 114a and 114b, such as a hydraulic piston, which could be controlled from a towing vehicle or from a separate control system. A hydraulic system (not shown) can couple the activity devices with the hydraulic system of a towing vehicle.

The actuating device(s) 114a, 114b could be contracted or expanded in order to bring the wheels into a neutral (straight) position, such as for backing, or to assist the operator to bring the system 100 out of a turn, or used to pull the system 100 out of a turn and into a straight ahead or aligned position. It would be understood by one of ordinary skill in the art that the actuating device may take any number of suitable forms including, but not limited to electric motors, pneumatic devices, or other actuation devices.

In normal towing, the steering system 100 may be configured to passively follow the towed vehicle. Accordingly, the linkages mechanically regulate the steering angles of the wheel assemblies so that the implement accurately follows the towing vehicle. For example, the size and positioning of the rotating plate, the length of the arms and the coupling points thereof, can be selected to control the angles of the wheels relative to each other.

Figure 2:
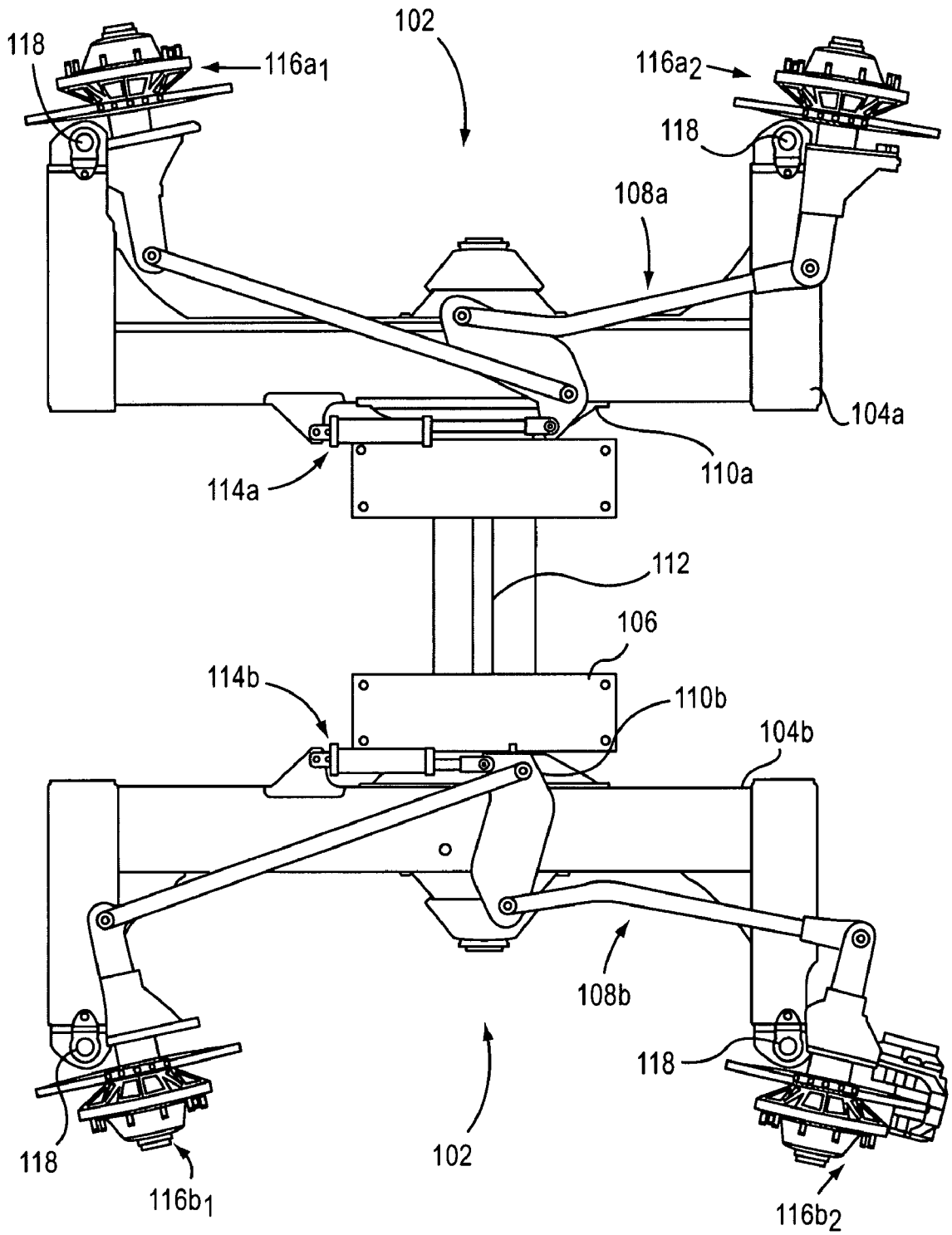

As shown in FIG. 2, movement of the front wheels $116a_1$ and $116b_1$ in the direction following the towing vehicle (not shown) causes the rotating couplings 110a and 110b to pivot thereby causing the linkage arrangements 108a and 108b to pivot rear wheels $116a_2$ and $116b_2$ in a direction following the turn of the towing vehicle. Actuating devices 114a and 114b can also be configured to provide resistance or dampening during the turn, if necessary.

According to an embodiment of the present invention, the wheel assemblies $116a_1$, $116a_2$, $116b_1$, and $116b_2$ can be manually controlled by actuation of the actuating devices 114a and 114b. Actuation of the actuating devices 114a and 114b causes rotation of the wheel assemblies $116a_1$, $116a_2$, $116b_1$, and $116b_2$ of the tandem axles 104a and 104b. For example, as shown in FIG. 2, when the actuating device 114a is extended (114b is contracted), the rotating coupling 110a rotates counterclockwise, which causes the linkage arrangements 108a move the wheel assemblies $116a_1$ and $116a_2$ thereby causing the wheel assemblies $116a_1$ and $116a_2$ to pivot outward in opposite directions about pivots $118a_1$ and $118a_2$. Likewise, when actuating device 114a is contracted (114b is extended), the rotating coupling 110b rotates counter clockwise causing the linkage arrangements 108b to move the wheel assemblies 116 thereby causing the wheel assemblies $116b_1$, and $116b_2$ to pivot inward in opposite directions about pivots $118b_1$, and $118b_2$. A control unit (not shown) could be provided control the actuating devices or hydraulic actuation could be provided from a towing vehicle, such as a tractor.

Figure 3:
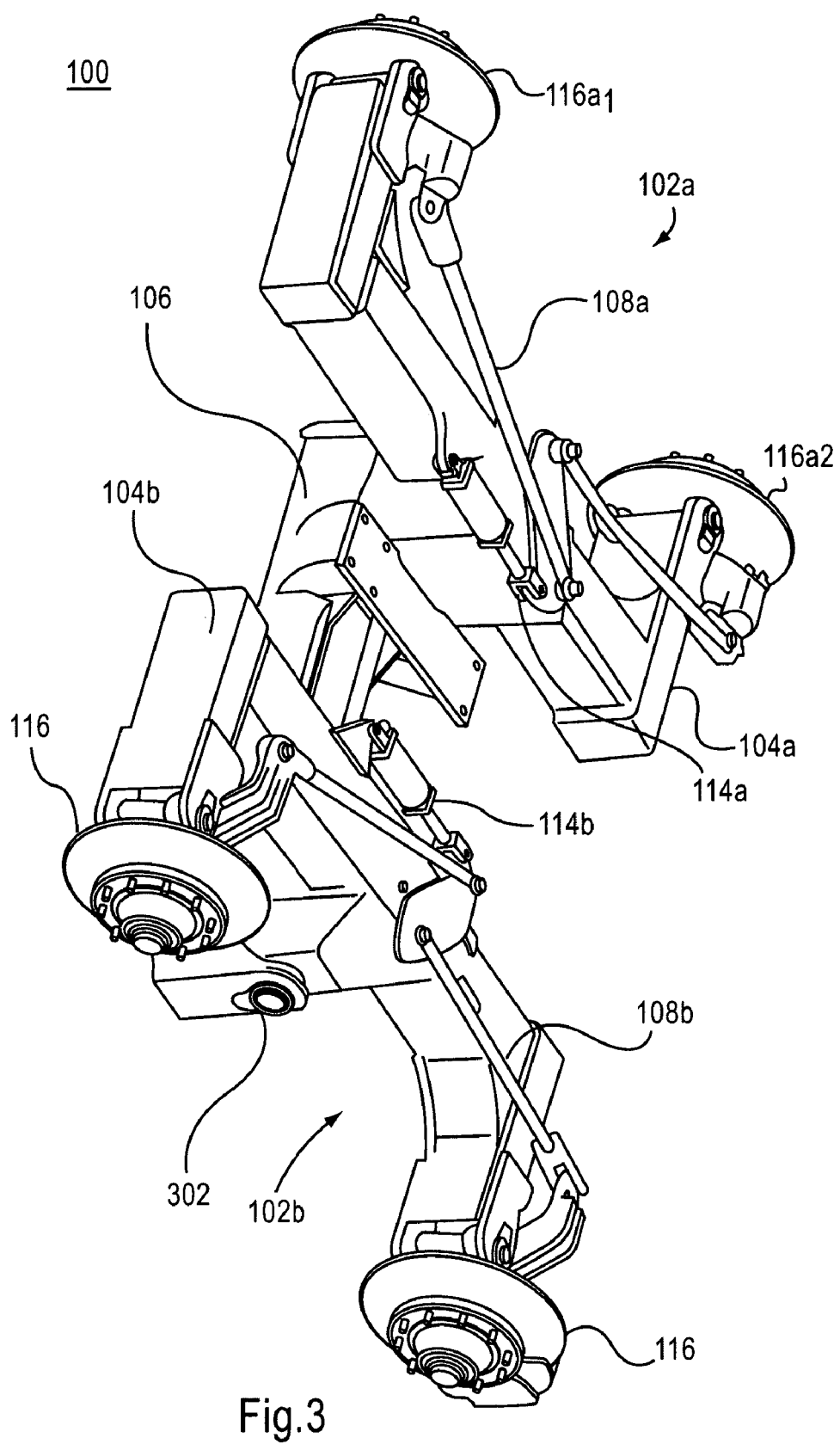

FIG. 3 is a perspective view of system 100. As shown, the tandem axles 104a and 104b can be connected to frame 106 by pivot connections 302. The pivot connections 302 allow the tandem axles 104a and 104b to pivot in the same plane as the wheel assemblies $116a_1$, $116a_2$, $116b_1$, and $116b_2$ rotate, when the four-wheel oscillating tandem steering system 100 travels over uneven ground or rocks, for superior off-road handling.

Figure 4:
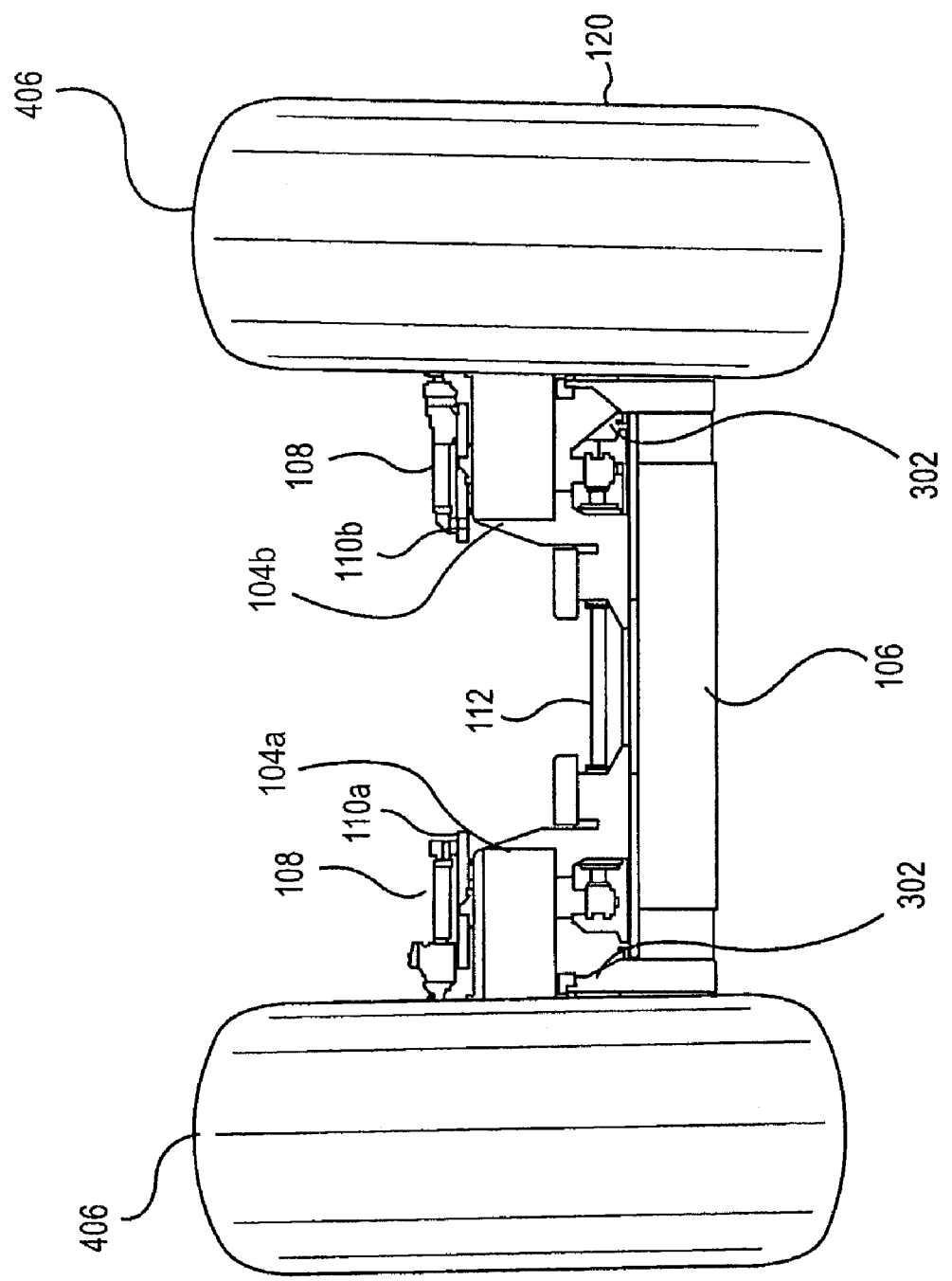

FIG. 4 is a front view of system 100. As shown, the pivot connection 302 pivotably joins the tandem axles 104a and 104b to the frame 106. Additionally, the right to left linkage 112 passes through the center pivot axis 120 so that the axles may pivot without affecting the steering geometry.

Figure 5:
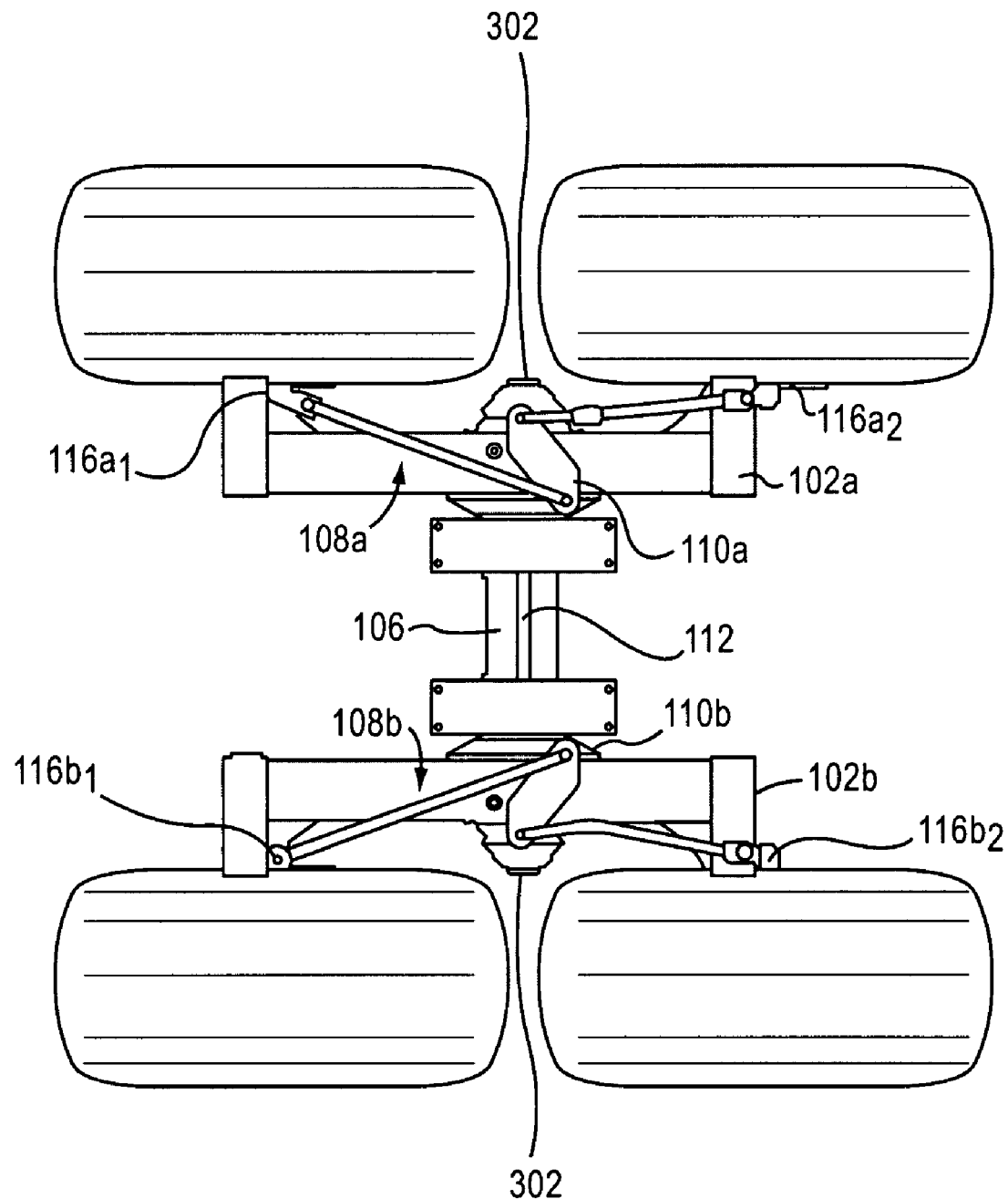
Figure 6:
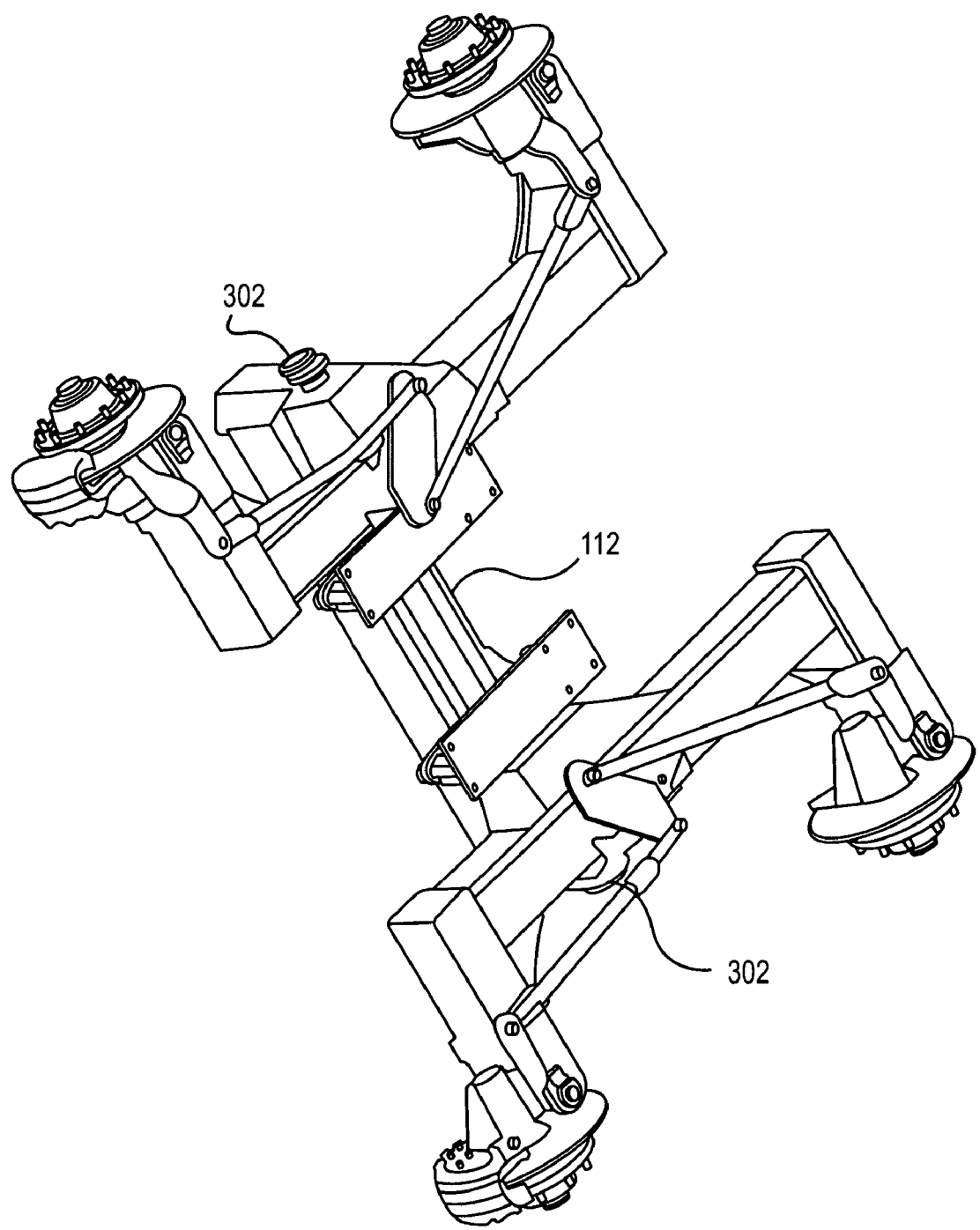

As shown in FIGS. 5 and 6, the right to left linkage 112 is aligned with the axis of the pivots 302. Accordingly, each in-line tandem axle 104a, 104b is allowed to pivot without affecting the steering angle of the wheel assemblies 116.

Figure 7:
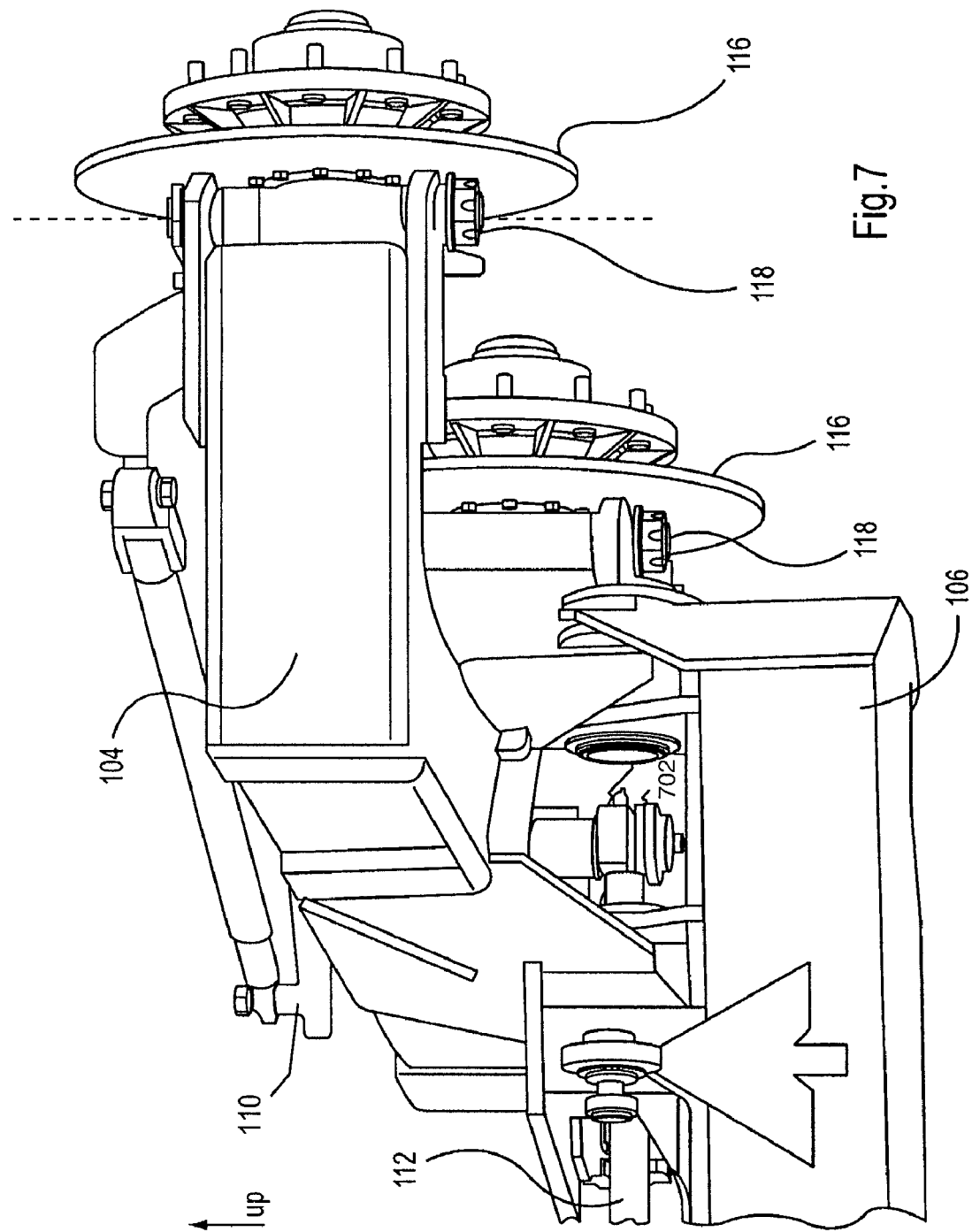

FIG. 7 is a detailed perspective representation of an in-line tandem wheel arrangement according to an embodiment of the present invention. As shown, the wheel assemblies 116 are connected to axle 104 via pivot 118 and are free to pivot about pivot 118. Also shown, the right to left linkage 112 is coupled to the rotating coupling 110 via coupling 702. Coupling 702 can be any appropriate mechanical coupling to rotationally connect the right and left rotating coupling 110. Appropriate reduction gearing or the like can be provided to effect proportional tuning angles.

Figure 8B:
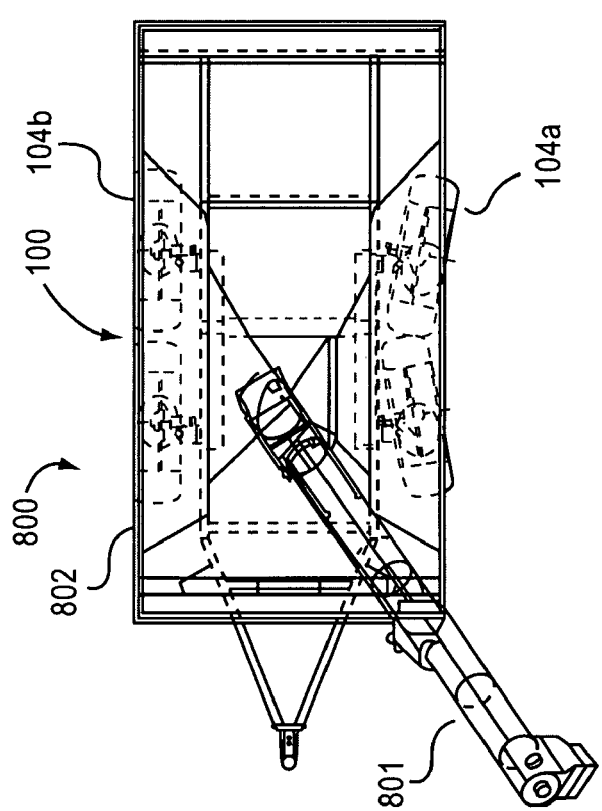
Figure 8C:
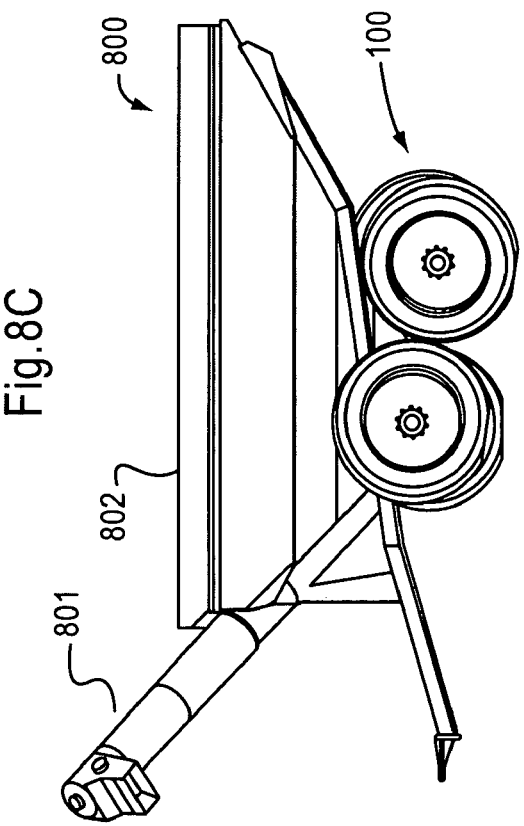
Figure 8A:
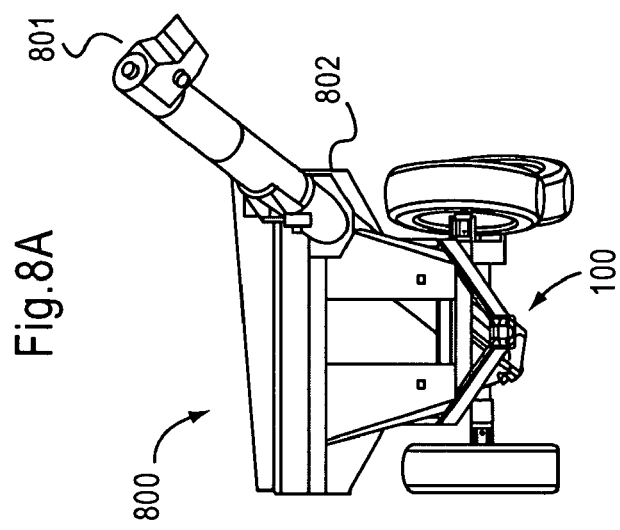

FIGS. 8A-8C and 9A-9C illustrate embodiments of the invention relating to a grain cart utilizing a steering system 100, as described and illustrated herein with respect to FIGS. 1-7. As shown, grain cart 800 includes a hopper 802 coupled with the steering system 100, and an auger elevator 801 that may be foldable. As shown in the FIGS. 8B and 9B, the steering system 100 configured to obtain a 10 degree oscillation. Exemplary, non-limiting dimensions are shown in FIGS. 8A-8C for perspective. As shown, the wheel assemblies on tandem axle 104a are configured to oscillate independently of the wheel assemblies of tandem axle 104b.

Figure 10:
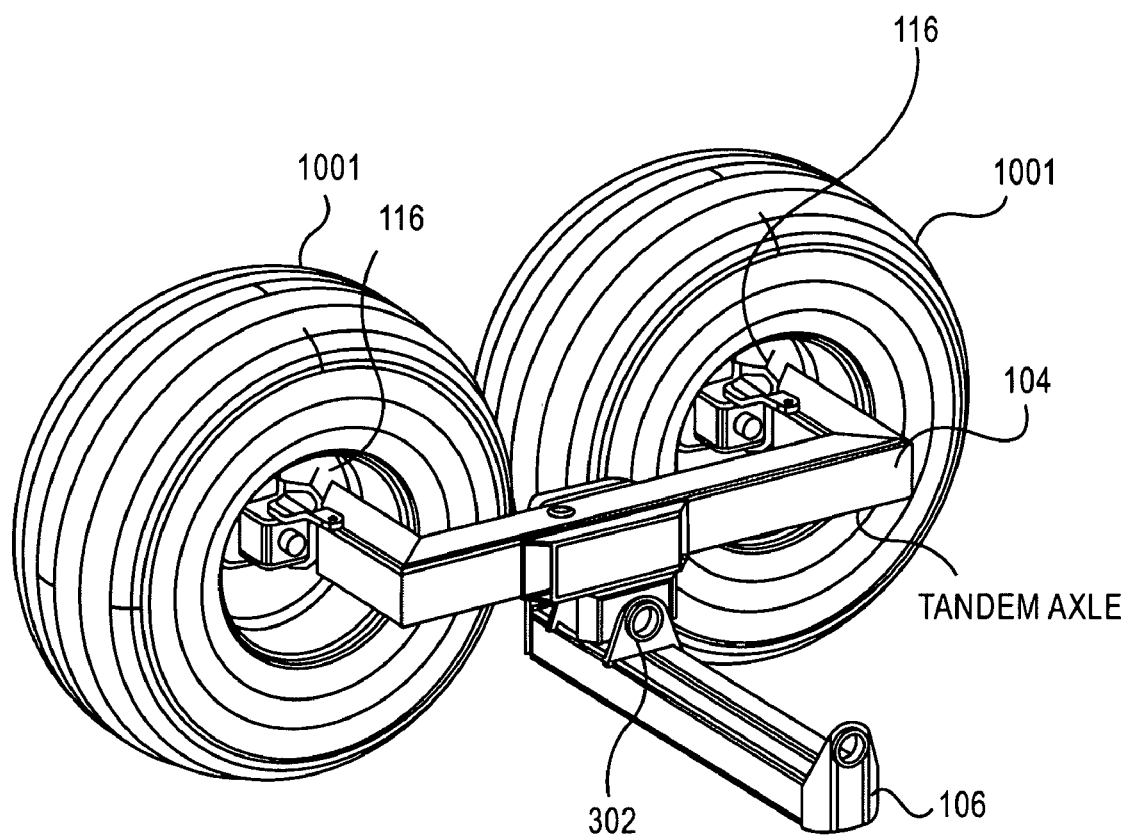
FIG. 10 is a view of a tandem axle.
Figure 11:
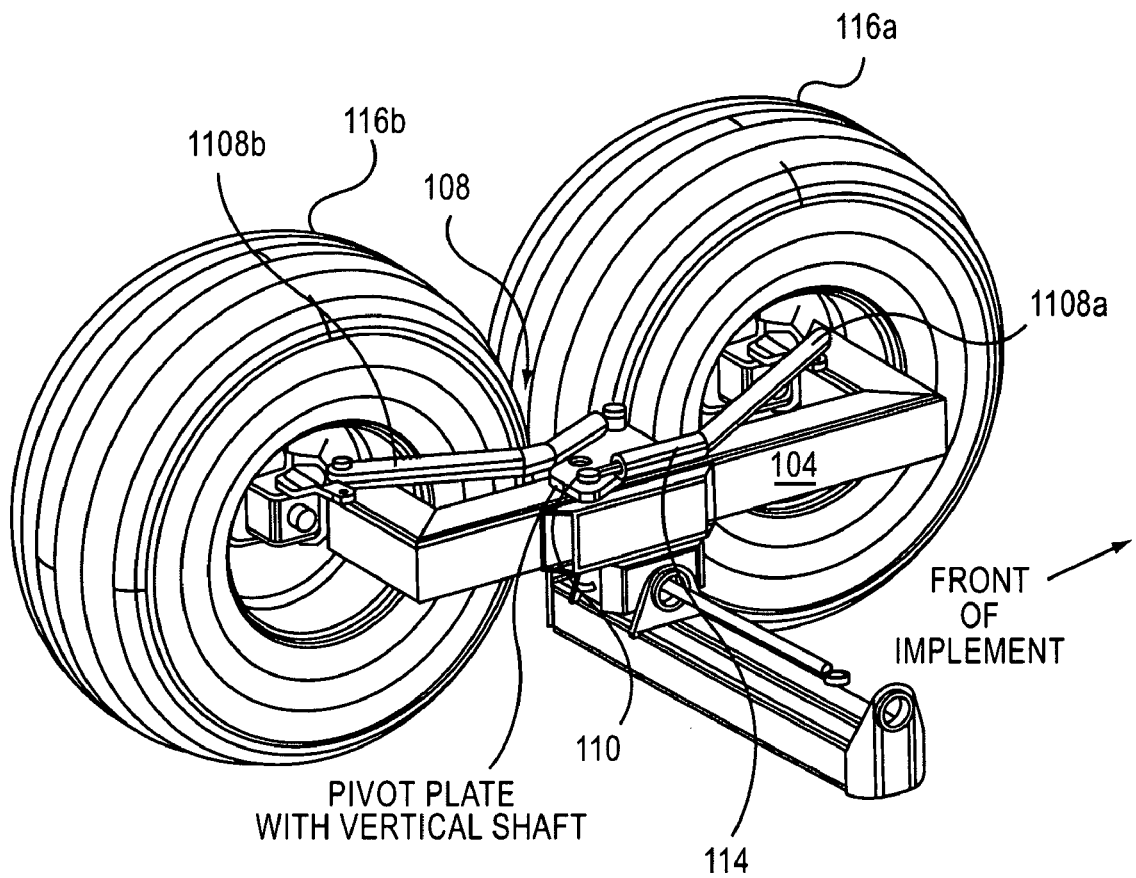
FIG. 11 is a view of a tandem axle according to an embodiment of the present invention.

FIG. 10 illustrates a single tandem axle without linkages. The tandem axle 104 is connected to frame 106 via pivot connection 302. Wheel assemblies 116 are shown with tires 1001. FIG. 11 illustrates the axle of FIG. 10 with the linkages—a linkage assembly 108, a rotating coupling, 110 and an actuating device 114—being provided. The tandem axle 104 has a linkage arrangement 108 connected to the wheels for steering. The arrangement 108 includes the rotating coupling 110 comprising a pivot plate with a vertical shaft. The rotating coupling is connected to an actuating device 114. Connecting rods 1108a and 1108b connect the forward 116a and rearward 116b wheel assemblies respectively to the rotating coupling 110.

Figure 12:
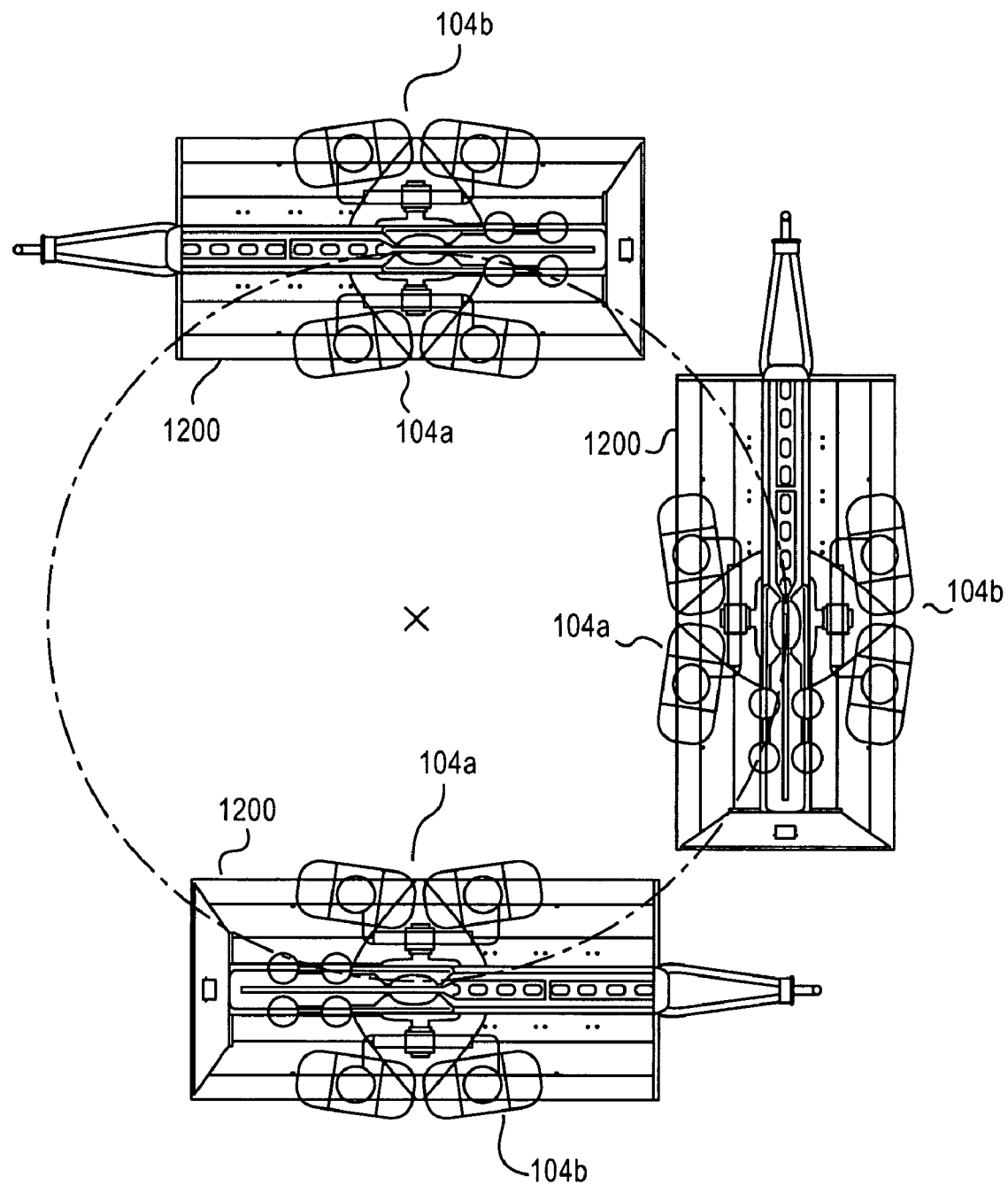
FIG. 12 illustrates an agricultural element having a steerable tandem system in the act of turning in a circle according to embodiments of the present invention.

FIG. 12 shows a grain cart 1200 having a steering system according to embodiments of the present invention, traveling in a turning radius. As can be clearly seen and understood, the inside 104a and outside 104b tandem wheels are controlled to oscillate at different degrees to give the wagon superior stability and excellent handling characteristics.

Figure 13:
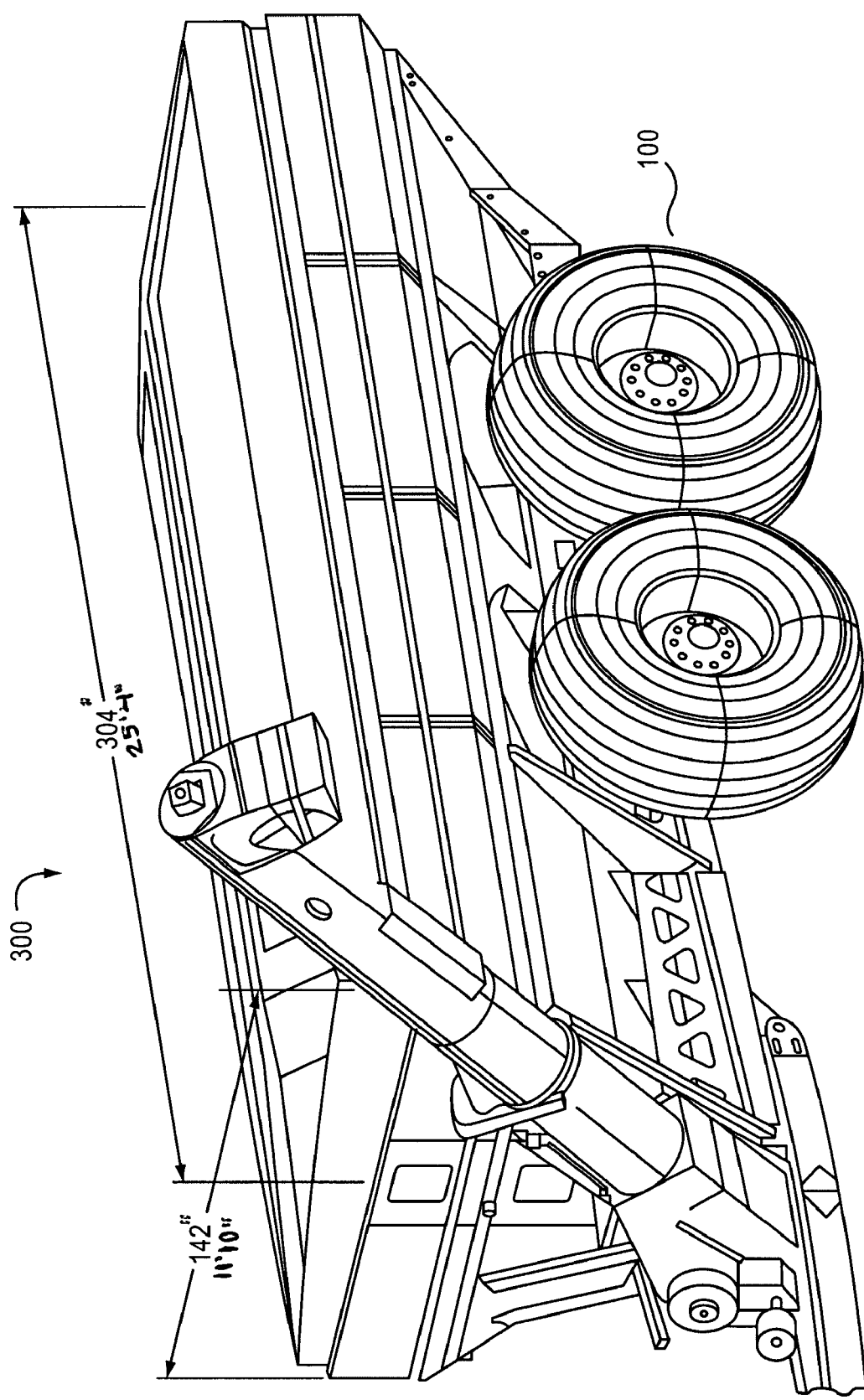
FIG. 13 illustrates an agricultural element having a steerable tandem system according to embodiments of the present invention.

FIG. 13 is a perspective view of a grain cart 1300 having a steering system 100 according to embodiments of the present invention.

One skilled in the art should recognize that the present invention can be fabricated from suitable materials, such as metal tubular frame pieces, sheet metal, steel, etc. Further, as appropriate, off-the-shelf components could be utilized for components of the present invention, such as, wheel spindles, bolts, lugs, etc.

Thus, a number of preferred embodiments have been fully described above with reference to the drawing figures. Other details of the embodiments of the invention should be readily apparent to one skilled in the art from the drawings. Although the invention has been described based upon these preferred embodiments, it would be apparent to those of skilled in the art that certain modifications, variations, and alternative constructions would be apparent, while remaining within the spirit and scope of the invention. For example, although the steering system of the present invention is described in terms of in-line tandems, the invention is not limited to a four wheel system and other multiple wheel systems are possible. For example, six wheel systems would work as well.

Further, the examples above include a grain wagon, however, the steerable wheel system could be utilized for a number of towed agricultural implements.

In one embodiment, the cross linkage is removed and the linkages could be configured to cause the outer wheels rotate at an angle that is different, but proportional, that the inside wheels as already described above.

We claim:

1. A multi-wheel oscillating tandem steering system for a pulled agricultural implement, comprising:
   first and second in-line axles pivotably coupled with a frame;
   at least first and second in-line wheel arrangements including a plurality of wheel assemblies arranged in-line and pivotably coupled with said first and second axles respectively, each wheel arrangement having wheel linkages coupling the in-line wheel assemblies such that in-line wheel assemblies oscillate together;
   wherein said wheel linkages each include a rotating coupling pivotably connected to the corresponding in-line axle, and a plurality of arms, each arm being connected to a wheel assembly and to the rotating coupling such that rotation of the rotating coupling causes each of the connected in-line wheel assemblies to turn; and
   a right-to-left linkage coupling the rotating coupling of the wheel linkage of the first in-line wheel arrangement to the rotating coupling of the wheel linkage of the second in-line wheel arrangement so that said first in-line wheel arrangement oscillates at a steering angle proportional to that of said second in-line wheel arrangement;
   wherein said wheel linkages and said right-to-left linkage are arranged such that each of said in-line wheel assemblies is caused to oscillate passively to steering angles that follow a vehicle towing said agricultural implement, and when in a turn, an inside wheel arrangement turns at an angle greater than an outside wheel arrangement.

2. The steering system as recited in claim 1, further comprising means for actively controlling movement of the wheel assemblies.

3. The steering system as recited in claim 1, further comprising means for self-aligning the wheel assemblies.

4. The steering system as recited in claim 1, further comprising at least one actuating device connected to at least one of said first and second wheel linkages for controlling movement of the wheel assemblies.

5. The steering system as recited in claim 4, wherein said actuating devices include hydraulic cylinders.

6. The steering system as recited in claim 4, wherein said actuating devices includes electric motors.

7. The steering system as recited in claim 4, wherein said actuating devices are configured to move said wheel assemblies into a neutral position.

8. The steering system as recited in claim 1, wherein said wheel linkages are arranged such that a first wheel assembly coupled with a first rotating coupling turns in a direction opposite to that of a second wheel assembly coupled with the first rotating coupling.

9. The steering system as recited in claim 7, wherein a rotating coupling of each wheel linkage is positioned rearward of a pivot connection between said in-line axle and said frame.

10. The steering system as recited in claim 1, wherein the right-to-left linkage is positioned on an axis through the center of a pivot connection between said in-line axle and said frame.

11. A steerable grain cart, comprising:
    a grain hopper coupled with a frame;
    first and second in-line axles pivotably coupled with the frame;
    first and second in-line wheel arrangements including a plurality of wheel assemblies arranged in-line and pivotably coupled with said first and second axles respectively, each wheel arrangement having wheel linkages coupling the in-line wheel assemblies such that in-line wheel assemblies oscillate together;
    wherein said wheel linkages each include a rotating coupling pivotably connected to the corresponding in-line axle, and a plurality of arms, each arm being connected to a wheel assembly and to the rotating coupling such that rotation of the rotating coupling causes each of the connected in-line wheel assemblies to turn; and
    a right-to-left linkage coupling the rotating coupling of the wheel linkage of the first in-line wheel arrangement to the rotating coupling of the wheel linkage of the second in-line wheel arrangement so that said first in-line wheel arrangement oscillates at a steering angle proportional to that of said second in-line wheel arrangement;
    wherein said wheel linkages and said right-to-left linkage are arranged such that each of said in-line wheel assemblies is caused to oscillate passively to steering angles that follow a vehicle towing said agricultural implement, and when in a turn, an inside wheel arrangement turns at an angle greater than an outside wheel arrangement.

12. The steerable grain cart as recited in claim 11, further comprising a plurality actuating devices are connected to said first and second wheel linkages for controlling movement of the wheel assemblies.

13. The steerable grain cart as recited in claim 12, wherein said actuating devices include hydraulic devices that can be controlled by a towing vehicle's hydraulic system.

14. The steerable grain cart as recited in claim 12, wherein said actuating devices includes electric motors.

15. The steerable grain cart as recited in claim 12, wherein said actuating devices are configured to move said wheel assemblies into a neutral position.

16. The steerable grain cart as recited in claim 11, wherein said wheel linkages are arranged such that a first wheel assembly coupled with a first rotating coupling turns in a direction opposite to that of a second wheel assembly coupled with the first rotating coupling.

17. The steerable grain cart as recited in claim 11, wherein a rotating coupling of each wheel linkage is positioned rearward of a pivot connection between said in-line axle and said frame.

18. The steerable grain cart as recited in claim 11, wherein the right-to-left linkage is positioned on an axis through the center of a pivot connection between said in-line axle and said frame.

* * * * *